US007589312B2

(12) United States Patent
Kojima

(10) Patent No.: US 7,589,312 B2
(45) Date of Patent: Sep. 15, 2009

(54) PHYSICAL QUANTITY MEASURING SYSTEM WITH FIBER BRAGG GRATING SENSOR AND ARRAYED WAVEGUIDE GRATING

(75) Inventor: Seiji Kojima, Hitachi (JP)

(73) Assignee: Hitachi Cable, Ltd., Tokyo (JP)

( * ) Notice: Subject to any disclaimer, the term of this patent is extended or adjusted under 35 U.S.C. 154(b) by 0 days.

(21) Appl. No.: 11/987,625

(22) Filed: Dec. 3, 2007

(65) Prior Publication Data

US 2008/0142693 A1 Jun. 19, 2008

(30) Foreign Application Priority Data

Dec. 15, 2006 (JP) .............. 2006-338378

(51) Int. Cl.
*G01J 5/08* (2006.01)
*G01B 9/02* (2006.01)
*G02B 6/26* (2006.01)

(52) U.S. Cl. ............ 250/227.18; 356/478; 385/15

(58) Field of Classification Search ............ 250/227.11, 250/227.14, 227.18, 227.23; 385/12, 13, 385/14; 356/478
See application file for complete search history.

(56) References Cited

U.S. PATENT DOCUMENTS 6,839,162 B2 * 1/2005 Sekiya et al. ............ 359/337.4
7,283,692 B2 * 10/2007 Xiao et al. .................. 385/12

2003/0108283 A1 * 6/2003 Ota et al. .................. 385/24
2006/0045412 A1 * 3/2006 Xiao et al. .................. 385/14
2007/0280605 A1 * 12/2007 Mendoza .................. 385/92

FOREIGN PATENT DOCUMENTS

| JP | 2005257624 | * | 9/2005 |
| JP | 2005257624 A | * | 9/2005 |
| JP | 3760649 | | 1/2006 |

OTHER PUBLICATIONS

"AWG Multi/Demultiplexer", Copyright 2003-2007 NTT Electronics Corporation.

* cited by examiner

*Primary Examiner*—Georgia Y Epps
*Assistant Examiner*—Jennifer Bennett
(74) *Attorney, Agent, or Firm*—McGinn IP Law Group, PLLC

(57) ABSTRACT

A physical quantity measuring system includes an optical fiber in which plural fiber Bragg gratings having different reflection wavelength changing bands are formed along the optical fiber in a longitudinal direction, a light source which outputs a broadband light into the optical fiber, an arrayed waveguide grating and an operating portion. The arrayed waveguide grating divides a light reflected by the fiber Bragg grating and outputted from the optical fiber into plural divisional wavelength bands. The arrayed waveguide grating outputs the divided lights to output channels. The operating portion detects a change of a reflected center wavelength of each fiber Bragg grating by a change of an output of each light-receiving element, operates a physical quantity and a position thereof given to the optical fiber, and is capable of detecting light from adjacent output channels.

10 Claims, 5 Drawing Sheets

PHYSICAL QUANTITY MEASURING SYSTEM WITH FIBER BRAGG GRATING SENSOR AND ARRAYED WAVEGUIDE GRATING

The present application is based on Japanese Patent Application No. 2006-338378 filed on Dec. 15, 2006, the entire contents of which are incorporated herein by reference.

BACKGROUND OF THE INVENTION

1. Field of the Invention

This invention relates to a physical quantity measuring system in which an amount of a light output from a fiber Bragg grating (FBG) can be measured exactly in a vicinity of a center wavelength of an output channel of an arrayed waveguide grating (AWG).

2. Description of the Related Art

There has been a physical quantity measuring system in which a physical quantity (e.g., temperature, strain, etc.) is measured according to a change of a reflected center wavelength of a fiber Bragg grating (FBG) in an optical fiber. In this physical quantity measuring system, an arrayed waveguide grating (AWG) is used.

FIG. 5 shows a conventional physical quantity measuring system disclosed in patent document 1 (JP-B-3760649). In this physical quantity measuring system, several FBGs (i.e., FBG1, FBG2, FBG3, FBG4, and FBG5) are formed in an optical fiber to which a measuring light from a broadband light source is inputted. A physical quantity, in a position where each FBG is disposed, is measured by detecting a wavelength of a reflected light from each FBG.

In this physical quantity measuring system, a minute wavelength range of the reflected light is assigned to the several FBGs without an overlap, the reflected light from each FBG is inputted to an AWG which can divide a light into a plurality of wavelengths having a minute difference of a center wavelength. A wavelength of the reflected light is measured based on a logarithm of a ratio of a photocurrent by pairs of light-receiving elements (photodiodes (PD)) which are disposed at each of plural output channels of the AWG.

In this physical quantity measuring system, a wavelength range of the reflected light from the FBGs is assigned between two output channels which are located adjacently each other in the AWG.

In FIG. 5, dividers DIV1~DIV5 output a ratio of a photocurrent of an adjacent photodiode by a logarithmic value.

This physical quantity measuring system has advantages that there is no movable portion, and that it is excellent in quake resistance and high-speed wavelength detectivity.

However, in this physical quantity measuring system, a reflected center wavelength of the FBG needs to be assigned between center wavelengths of two adjacent output channels in the AWG and in a linear part with respect to a relation between a wavelength change of a reflected light of the FBG and a logarithm value as shown in FIG. 6. Thereby, several problems will occur.

First of all, when the reflected center wavelength of the FBG changes more than a center wavelength interval (divisional wavelength bandwidth) of adjacent output channels in the AWG, it has been difficult to detect the change. That is, when an AWG having a broad divisional wavelength bandwidth is used in order to detect a great change of the reflected center wavelength in the FBG, a change of a logarithmic value becomes gentle (gradual) compared to that of the wavelength itself, and it becomes difficult to detect a minute change of the reflected center wavelength in the FBG. For example, an AWG which has a divisional wavelength bandwidth of 0.2, 0.4, 0.6, 0.8, or 1.6 nm, is currently marketed (e.g., Internet website of NTT Electronics Corporation as of Nov. 3, 2006, http://www.nel-world.com/products/photonics/awg_mul_d.html). Meanwhile, since the FBG has a strain sensitivity of about 1.2 pm/μstrain and a temperature sensitivity of about 10 pm/° C., when measuring a strain more than 1400 μstrain, the reflected center wavelength of the FBG changes more than 1.6 nm. Therefore, it is difficult to measure the strain including a change of the reflected center wavelength of the above commercial FBG.

Further, in order to assign the linear part with respect to a relation between a change of the reflected center wavelength and a logarithm value within a range of the reflected center wavelength of the FBG, an exact center wavelength design with respect to the AWG and the FBG is necessary.

Additionally, when the reflected center wavelength is changed more than the divisional wavelength bandwidth of the AWG due to a temperature or a strain, the reflected center wavelength of the FBG needs to be adjusted by changing a strain or a temperature of the AWG so that the reflected center wavelength of the FBG can be in the linear part with respect to a relation between a change of the reflected center wavelength and a logarithmic value.

The above problems will be described below in more detail.

When receiving a reflected light of the FBG, in which a reflected center wavelength thereof changes in a broad range covering from a divisional wavelength band of a first output channel of the AWG to a divisional wavelength band of another output channel adjacent to the first output channel (i.e., when receiving a reflected light from the FBG in case that a reflected center wavelength thereof slightly changes in a vicinity of a certain output channel of the AWG), since a transmission loss of the output channel adjacent to the former output channel is great, it is difficult to exactly measure an amount of a reflected light from the FBG.

For example, FIG. 7 shows a transmission characteristic of an AWG, which has a center wavelength interval (divisional wavelength bandwidth) of 1.6 nm (interval of 200 GHz in frequency), a half bandwidth of 0.8 nm, a maximum transmission rate of 100%, a transmission rate having a Gaussian distribution, and 4 output channels in a wavelength band of 1539~1543.8 nm.

With respect to a center wavelength ($\lambda_c$) of each output channel, a transmission loss of an output channel #1 and an output channel #3, which are adjacent to an output channel #2, are 48 dB at the center wavelength of the output channel #2, which is extremely great. When a reflected center wavelength of the FBG moves to the center wavelength of the output channel #2, an amount of reflected light can be measured in the output channel #2, but it is difficult to measure the amount of the reflected light in the output channel #1 and the output channel #3, which are adjacent to the output channel #2, due to a great loss.

Next, a reflection loss characteristic of a fiber Bragg grating with respect to a wavelength is considered.

FIG. 8 shows a reflection loss characteristic with regard to a wavelength of an FBG, which has a half bandwidth of 0.1 nm, a maximum transmission rate of 90%, and a Gaussian distribution concerning the reflection loss characteristic with regard to a wavelength. FIG. 9 shows a characteristic of an amount of a light output with regard to a wavelength, which represents an amount of a light output with regard to a change of a reflected center wavelength that changes from 1539.4 nm to 1543.4 nm. In this case, a light amount as to a center wavelength of each output channel is defined as 1 (a ratio of the light amount is 0 dB).

As shown in FIG. 9, when an amount of a light output at a center wavelength of 1540.6 nm of the output channel #2 is set to 0 dB, an amount of light output of the output channel #1 and the output channel #3 as to the center wavelength of 1540.6 nm, is about $2*10^{-5}$ (about −47 dB) and very small. Since it is difficult to measure a light amount less than $1*10^{-4}$ (about −40 dB), as mentioned below, the amount of the light output of only output channel #2 can be measured in a wavelength range of 1540.46 nm to 1540.74 nm, which is shown by arrows in FIG. 9.

In this case, since a characteristic of an amount of a light output as to the channel #2 has a convex shape in which a center thereof is a center wavelength, when a reflected center wavelength of the FBG shifts from the center wavelength either to a shorter wavelength or to a greater wavelength, the amount of light output decreases. However, when the reflected center wavelength of the FBG changes slightly in a range of a wavelength of 1540.46 nm to 1540.74 nm which is in a vicinity of the center wavelength of the output channel #2, since the amount of light output is measured only as to the output channel #2, it is difficult to detect exactly whether the reflected center wavelength of the FBG changes to a shorter wavelength or to a greater wavelength.

Further, a reason why it is difficult to measure a light amount less than −40 dB is described below.

That is, it is difficult to obtain a crosstalk less than −40 dB in manufacturing of an AWG, and there is no filtering characteristic such as a Gaussian distribution in a wavelength range less than −40 dB.

Further, when a light of an output channel of an AWG is converted to electricity (analog) and then a voltage of the electricity is obtained in a digital value, it is difficult to measure a dynamic range more than 40 dB (the dynamic range more than 40 dB means, for example, to measure a voltage of 1 mV exactly and linearly when a maximum voltage is 10 V).

SUMMARY OF THE INVENTION

In view of the foregoing and other exemplary problems, drawbacks, and disadvantages of the conventional methods and structures, an exemplary feature of the present invention is to provide a physical quantity measuring system which can measure an amount of a light output from an FBG even in a vicinity of a center wavelength of an output channel of an AWG.

(1) According to one exemplary aspect of the invention, a physical quantity measuring system includes:

an optical fiber in which a plurality of fiber Bragg gratings having different reflection wavelength changing bands are formed along said optical fiber in a longitudinal direction;

a light source which outputs a broadband light covering the reflection wavelength changing bands of all of the fiber Bragg gratings, into the optical fiber;

an arrayed waveguide grating which divides a light reflected by the fiber Bragg gratings and outputted from the optical fiber into a plurality of divisional wavelength bands having a constant wavelength interval, and which outputs the divided lights to output channels, respectively;

a plurality of light-receiving elements that receive output lights from the output channels, respectively; and an operating portion which detects a change of a reflected center wavelength of each fiber Bragg grating by a change of an output of each light-receiving element, and which calculates a physical quantity and a position thereof given to the optical fiber, said operating portion capable of detecting light from adjacent output channels.

(2) According to another exemplary aspect of the invention, a physical quantity measuring method includes:

disposing an optical fiber in which a plurality of fiber Bragg gratings having different reflection wavelength changing bands are formed along said optical fiber in a longitudinal direction;

outputting a broadband light covering the reflection wavelength changing bands of all of the fiber Bragg gratings into the optical fiber by a light source;

dividing a light reflected by the fiber Bragg gratings and outputted from the optical fiber into a plurality of divisional wavelength bands having a constant wavelength interval by an arrayed waveguide grating, and outputting the divided lights to output channels, respectively;

receiving output lights from the output channels, respectively, by a plurality of light-receiving elements; and detecting a change of a reflected center wavelength of each fiber Bragg grating by a change of an output of each of said light-receiving elements by an operating portion, and calculating a physical quantity and a position thereof given to said optical fiber, wherein said operating portion is capable of detecting light from adjacent output channels.

(3) According to another exemplary aspect of the invention, a physical quantity measuring system includes:

an optical fiber in which a plurality of fiber Bragg gratings having different reflection wavelength changing bands are formed along said optical fiber in a longitudinal direction;

a means for outputting a broadband light covering the reflection wavelength changing bands of all of the fiber Bragg gratings into the optical fiber;

a means for dividing a light reflected by the fiber Bragg gratings and outputted from the optical fiber into a plurality of divisional wavelength bands having a constant wavelength interval, and outputting the divided lights to output channels, respectively;

a means for receiving output lights from the output channels, respectively; and a means for detecting a change of a reflected center wavelength of each fiber Bragg grating by a change of an output of said means for receiving output lights, and for calculating a physical quantity and a position thereof given to the optical fiber, wherein the means for detecting a change is capable of detecting light from adjacent output channels.

BRIEF DESCRIPTION OF THE DRAWINGS

The foregoing and other exemplary purposes, aspects and advantages will be better understood from the following detailed description of an exemplary embodiment of the invention with reference to the drawings, in which.

DETAILED DESCRIPTION OF THE EXEMPLARY EMBODIMENTS

Figure 1:
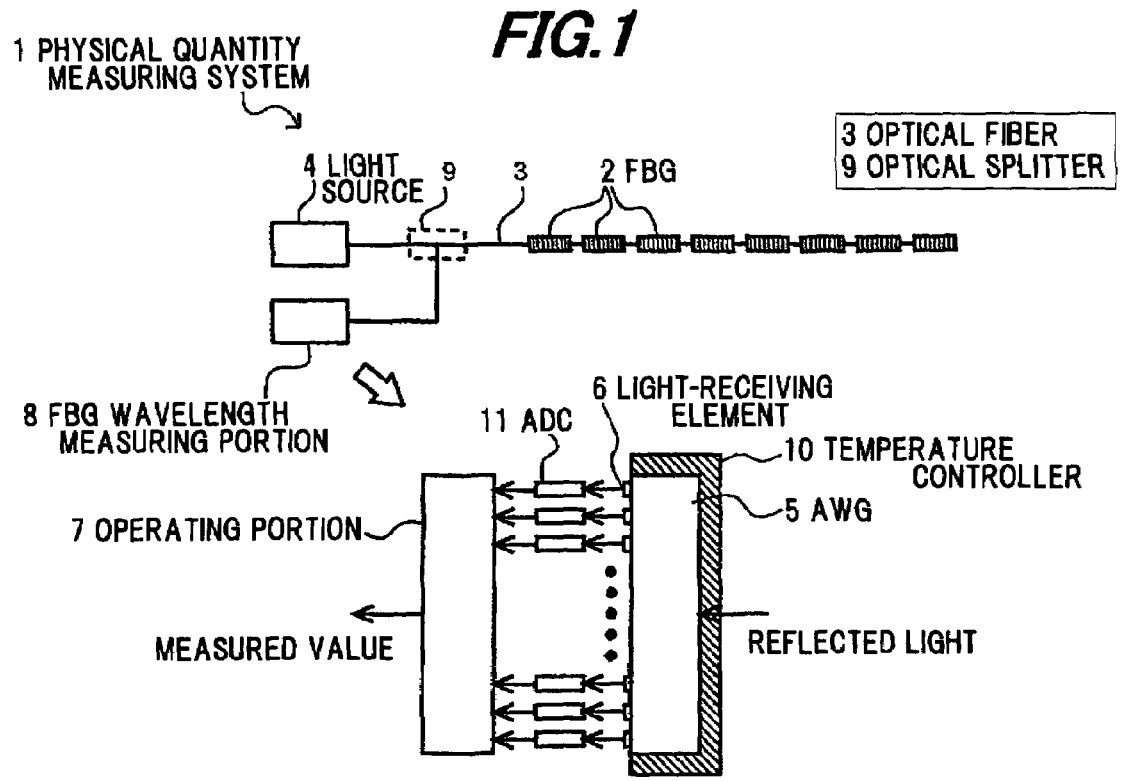
FIG. 1 is a block diagram showing a physical quantity measuring system 1 in an exemplary embodiment according to the present invention.

Referring now to the drawings, and more particularly to FIGS. 1 to 10, there are shown exemplary embodiments of the methods and structures according to the present invention.

Exemplary Embodiment

As shown in FIG. 1, a physical quantity measuring system 1 according to this exemplary embodiment includes an optical fiber 3 in which a plurality of fiber Bragg gratings 2 (hereinafter, "FBG") having different reflection wavelength changing bands are formed at a predetermined position in a longitudinal direction, a light source 4 for inputting a broadband light covering the reflection wavelength changing band of all of the FBGs 2 to the optical fiber 3, an arrayed waveguide grating 5 (herein after, "AWG") for dividing a reflected light from the FBG 2, which is outputted from the optical fiber 3, into several divisional wavelength bands having a constant wavelength interval and for outputting them to each output channel, respectively, a plurality of light-receiving elements 6 which receive the output light of each output channel, and an operating portion 7 (e.g., central processing unit (CPU)) which detects a change of a reflected center wavelength of each FBG 2 by a change of an output of each light-receiving element 6, and which calculates a physical quantity (e.g., strain, temperature, etc.) and a position thereof which are given to the optical fiber 3.

The AWG 5 through the operating portion 7 is defined as an FBG wavelength measuring portion 8, as a whole. An optical splitter 9 is disposed so as to conduct a broadband light from the light source 4 to the optical fiber 3, and conducts a light outputted from the optical fiber 3 to the FBG wavelength measuring portion 8. A coupler or a circulator may be used as the optical splitter 9.

In this exemplary embodiment, the FBGs 2 having a different reflection wavelength changing band are formed at eight (8) points in a longitudinal direction of the optical fiber 3. These FBGs 2 can be formed at a position where a physical quantity such as a strain or a temperature can be measured.

Meanwhile, the AWG 5 includes a plurality of output channels which are set in a constant wavelength interval which is included in a wavelength range of the broadband light outputted from the light source 4. In this case, if the AWG 5 has 40 channels which have different divisional wavelength bands and if a central frequency interval is 100 GHZ, the divisional wavelength bandwidth is about 32 nm.

Figure 5:
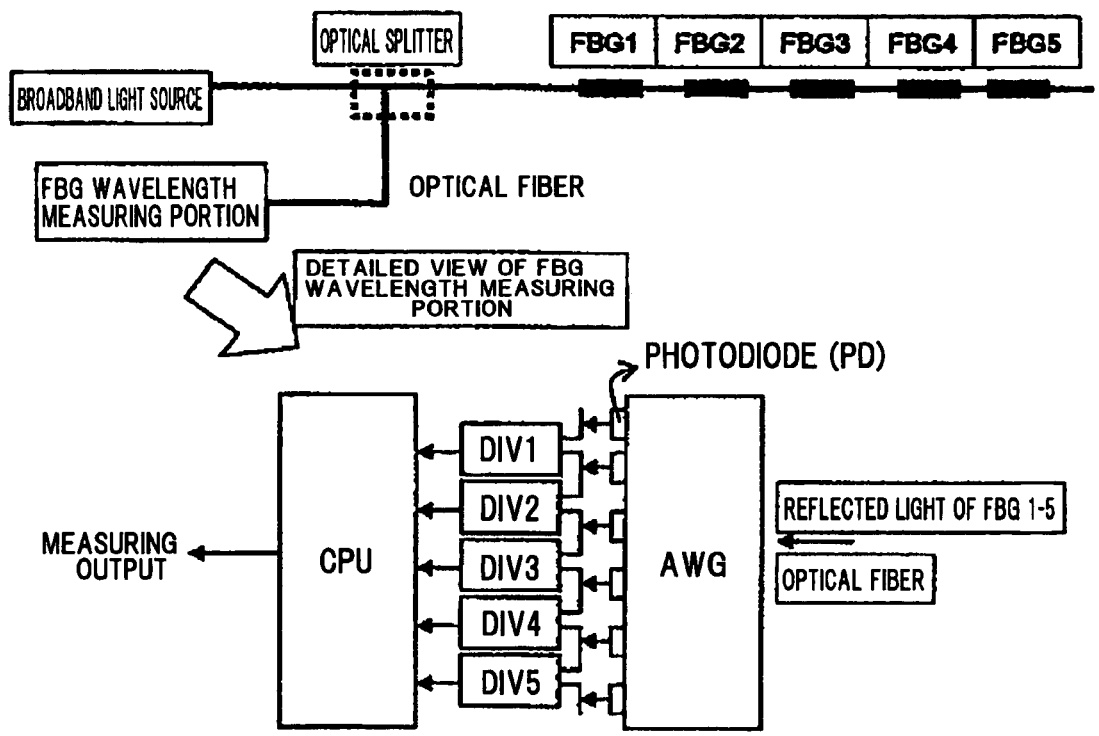
FIG. 5 is a block diagram showing a conventional physical quantity measuring system.
Figure 6:
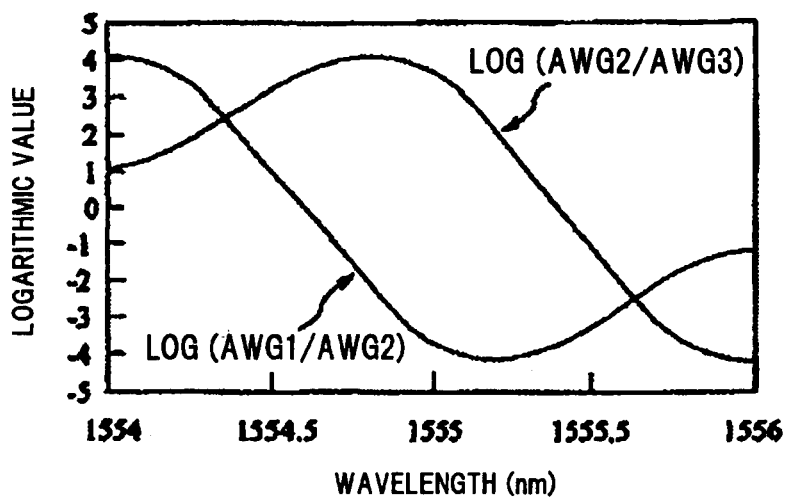
FIG. 6 is a characteristic graph showing a logarithmic value with regard to a wavelength according to the conventional physical quantity measuring system.

In contrast to the AWG of the conventional system in FIG. 5, the AWG 5 of the present invention is contained in a temperature controller 10 which includes an athermal (insulative) structure, a Peltier element, and a heater. Thus, in the present invention, the divisional wavelength band is prevented from changing thereof by keeping a temperature of the AWG 5 at a predetermined temperature by the temperature controller 10.

A photodiode (PD) may be used as the light-receiving element 6. That is, the PD may be disposed at each of the output channels of the AWG 5. The light-receiving element 6 may be an arrayed light-receiving element.

A CPU may be used as the operating portion 7. In order to input a light amount received by each of the light-receiving elements 6 into a digital input-output channel of the operating portion 7, an analog-digital converter (ADC) 11 is disposed between the digital input-output channel and each of the light-receiving elements 6. By using an analog-digital converter 11 which is, for example, made by Analog Devices, Inc. and available to transmit faster than 100 MS/sec, the physical quantity measuring system 1 according to the present invention can measure a physical quantity at 100 MS/sec. A dynamic range of the ADC 11 is the same as a dynamic range of the operating portion 7. In this case, the MS is an abbreviation of "mega sampling", and means $100*10^6$ times of samplings in 1 second.

Figure 3:
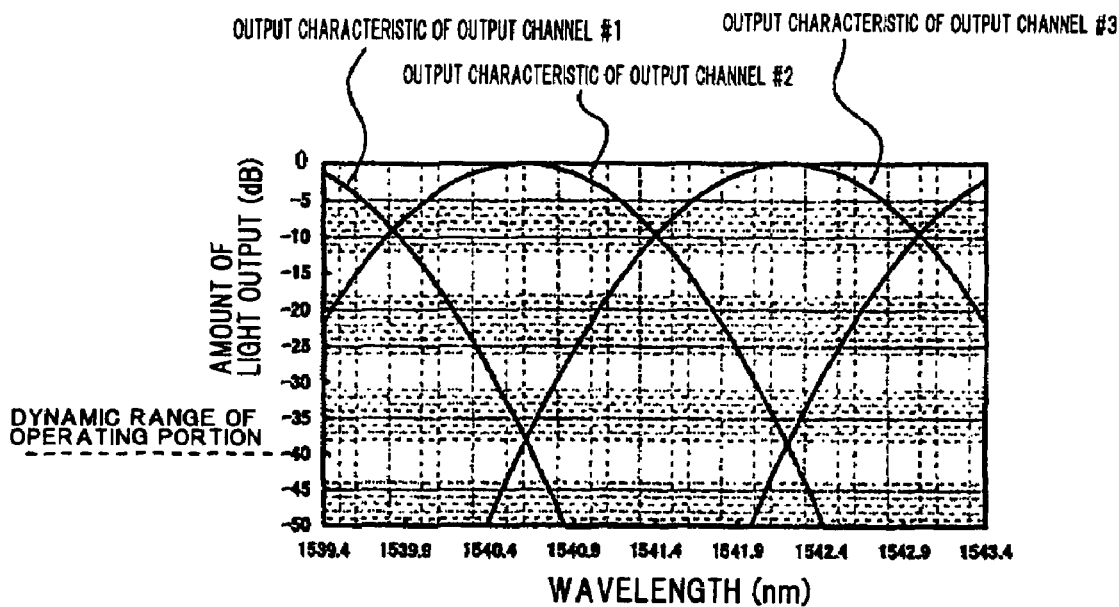
FIG. 3 is a characteristic graph showing an amount of a light output with regard to a wavelength according to an arrayed waveguide grating (AWG) 5 of the present invention.

As shown in FIG. 3, in the present invention, the dynamic range of the operating portion 7, the reflection loss characteristic of the FBG 2 with respect to a wavelength, and the transmission loss characteristic of the AWG 5 with respect to a wavelength, may be set to a characteristic, in which a difference between adjacent output channels in a characteristic of an amount of a light output with respect to a wavelength based on a superposition of the reflection loss characteristic of the FBG 2 with respect to a wavelength and the transmission loss characteristic of the AWG 5 with respect to a wavelength, can be kept within the dynamic range (e.g., 40 dB) of the operating portion 7 with respect to the band of the reflection wavelength change of the FBG 2.

For example, assuming that the dynamic range of the operating portion 7 is 40 dB, a half bandwidth in the reflection loss characteristic of the FBG 2 with respect to a wavelength is equal to or more than $225/1000$ of the divisional wavelength bandwidth in the transmission loss characteristic of the AWG 5 with respect to a wavelength. In this case, since ½ of the wavelength interval of the AWG 5 is not always the half bandwidth, it may be necessary that the half bandwidth in the reflection loss characteristic of the FBG 2 with respect to a wavelength is equal to or more than $45/100$ of a half bandwidth in the transmission loss characteristic of the AWG 5 with respect to a wavelength.

A principle of measuring a physical quantity (operation of the system) in the physical quantity measuring system 1 of FIG. 1 is described below.

A light having a certain range of a band (quantitatively represented by a half bandwidth) around the reflected center wavelength of each FBG 2 out of broadband lights inputted to the optical fiber 3 from the light source 4, is reflected by each FBG 2. This reflected light is divided by a wavelength by the AWG 5, and outputted to an appropriate output channel. An amount of the light output is converted to a voltage by the light-receiving element 6, and then to a digital value by the ADC 11, and inputted to the operating portion 7.

Since the reflected center wavelength of each of the FBGs 2 is within any of divisional wavelength bands of the AWG 5, a sufficient amount of a light output can be obtained at the light-receiving element 6 of an appropriate output channel (e.g., output channel #2). Further, concerning the light-receiving element 6 of an output channel #1 adjacent thereto, since a difference of an amount of a light output between output channels is within the dynamic range of the operating portion 7, a sufficient amount of a light output can be obtained. Therefore, a digital value, which is outputted from the ADC 11 and can be processed, is read by the operating portion 7 and converted to a voltage value.

When a physical quantity at a position where each FBG 2 is disposed changes, the reflected center wavelength of the FBG 2 is changed. However, since the half bandwidth and the Gaussian distribution is not changed, a characteristic shown in FIG. 2 results in shifting along an axis of a wavelength. When the reflected center wavelength of the FBG 2 changes, a voltage value outputted from the ADC 11 is changed like FIG. 10 (0-10 V in a vertical axis). In this case, an output voltage in a case of the maximum light amount is 10 V.

By measuring an output voltage of each output channel with respect to a change of the reflected center wavelength of the FBG 2 in advance, a change of the reflected center wavelength can be obtained simply by measuring the output voltage of each output channel.

That is, in the physical quantity measuring system 1 according to the present invention, since a correlation between an amount of a change of the reflected center wavelength of the FBG 2 and an amount of a change of a physical quantity is known, the operating portion 7 can process an amount of a change of the physical quantity by an amount of a change of the reflected center wavelength.

Additionally, since each of the FBGs 2 can be distinguished by an output channel number (the number of the ADC 11), and since a position where each of the FBGs 2 is disposed is known, the operating portion 7 can process a position of the physical quantity based on processing as mentioned above.

An operation of the present invention is described below.

In the present invention, in order to address conventional problems, when the dynamic range of the operating portion 7 is 40 dB, the half bandwidth of the FBG 2 is equal to or more than $225/1000$ of the divisional wavelength bandwidth, or equal to or more than $45/100$ of the half bandwidth of the AWG 5. Thereby, a difference of an amount of a light output between a certain output channel of the AWG 5 and an adjacent output channel thereto can be more than −40 dB. Therefore, since the difference of the amount of the light output between adjacent output channels is within the dynamic range of the operating portion 7, the amount of the light output from the FBG 2 can be measured even in a vicinity of the center wavelength of the output channel of the AWG 5, and the reflected center wavelength which changes broadly across the divisional wavelength bands of a plurality of output channels of the AWG 5, can be measured precisely.

Figure 7:
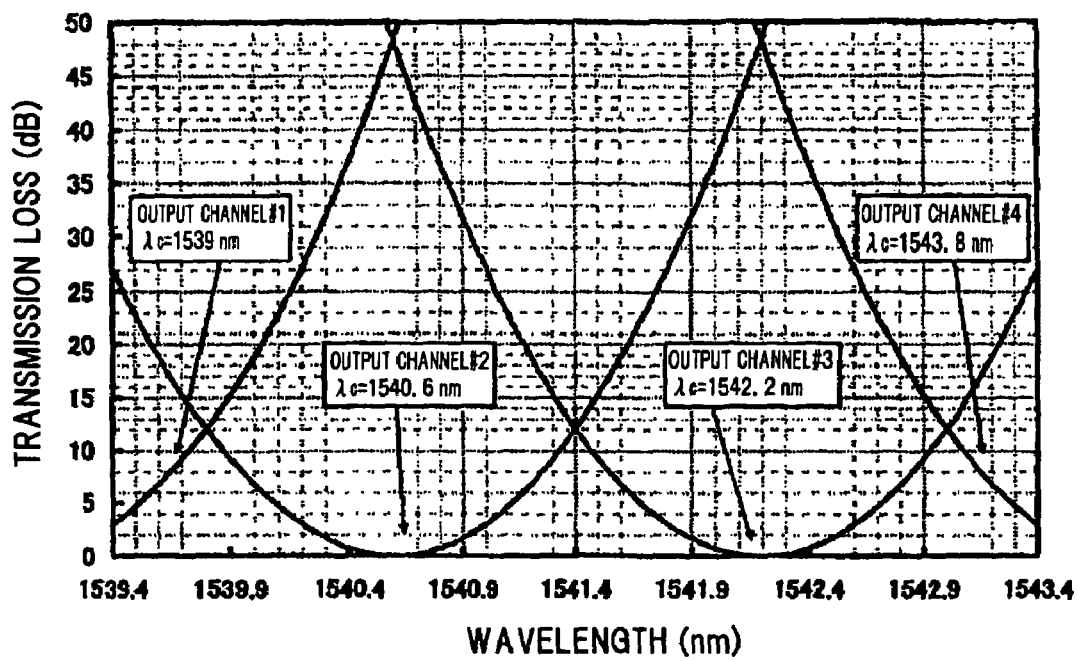
FIG. 7 is a characteristic graph showing a transmission loss of an AWG with regard to a wavelength according to the conventional physical quantity measuring system.
Figure 8:
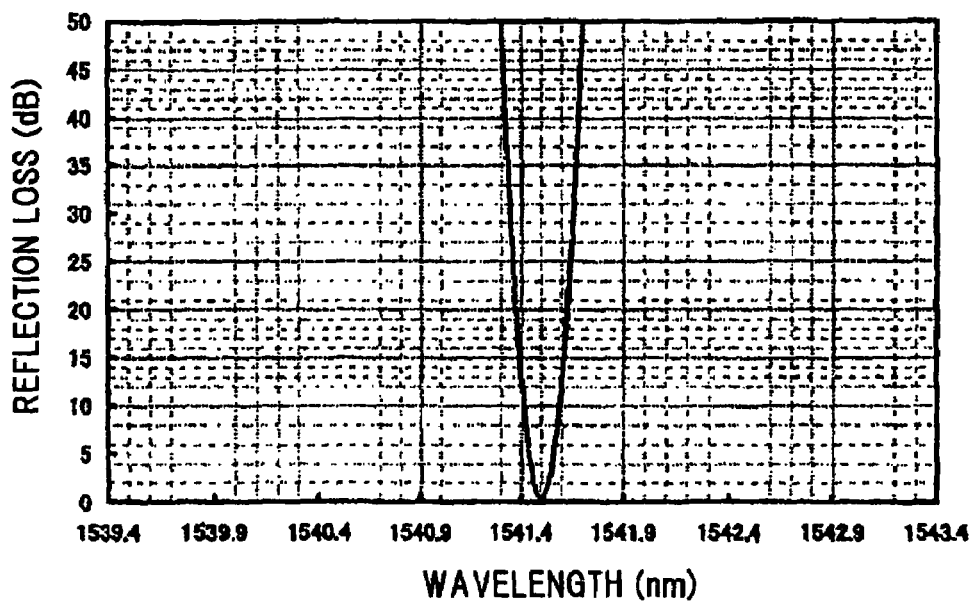
FIG. 8 is a characteristic graph showing a reflection loss of an FBG with regard to a wavelength according to the conventional physical quantity measuring system.
Figure 9:
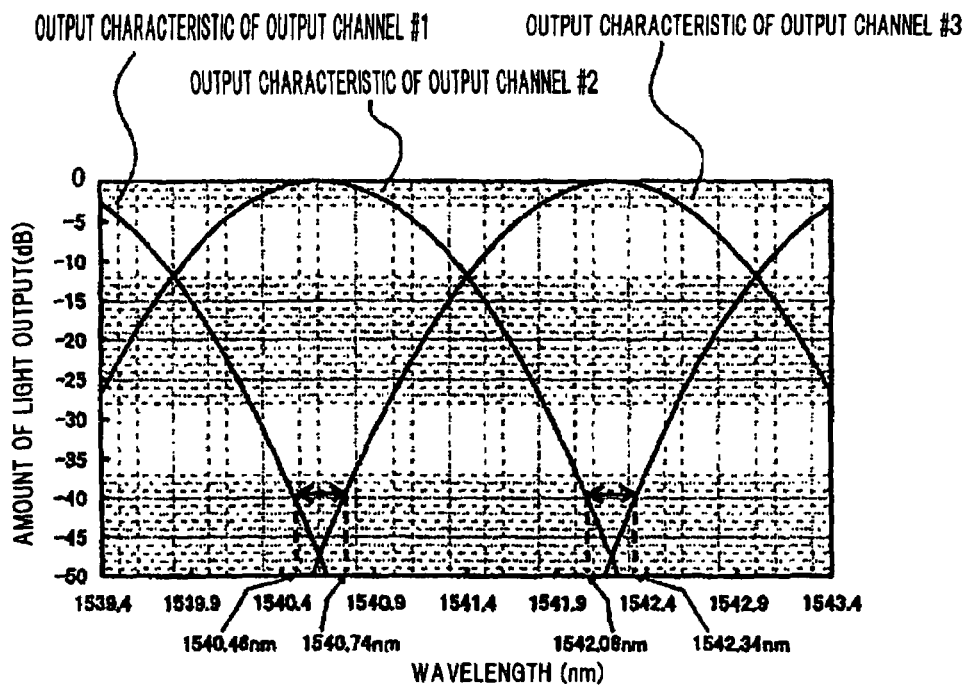
FIG. 9 is a characteristic graph showing an amount of a light output with regard to a wavelength as to each output channel of an AWG according to the conventional physical quantity measuring system.
Figure 10:
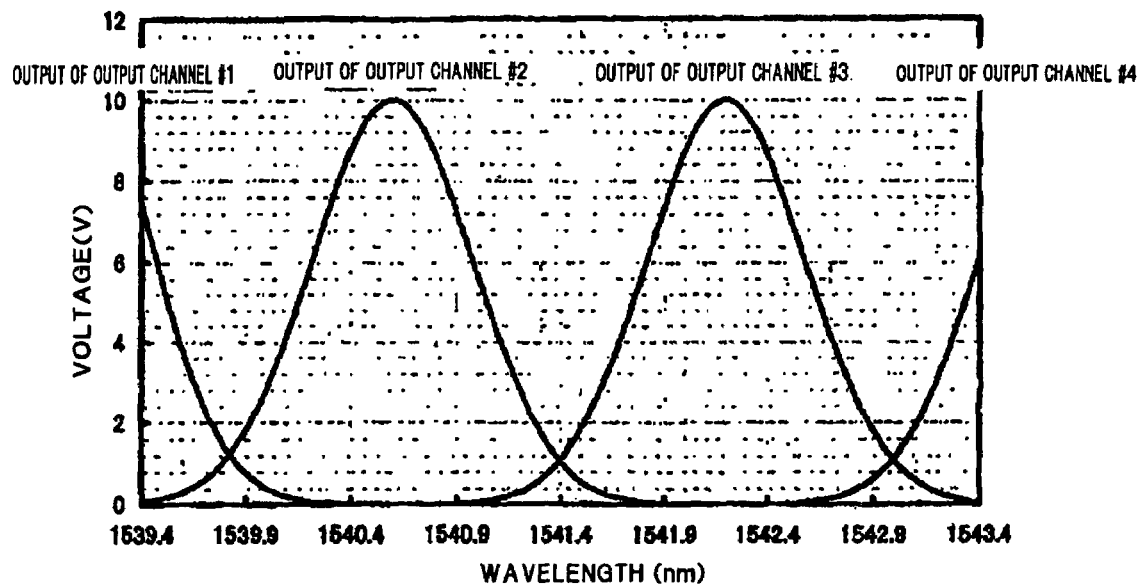
FIG. 10 is a characteristic graph showing an output voltage with regard to a wavelength according to the physical quantity measuring system of the present invention.

For example, it is assumed that an AWG having a transmission loss characteristic with respect to a wavelength as shown in FIG. 7 is used. The transmission loss characteristic of the AWG with respect to a wavelength has a divisional wavelength bandwidth of 1.6 nm, a half bandwidth of 0.8 nm, and a Gaussian distribution. The divisional wavelength bandwidth is 200 GHz in frequency.

Figure 2:
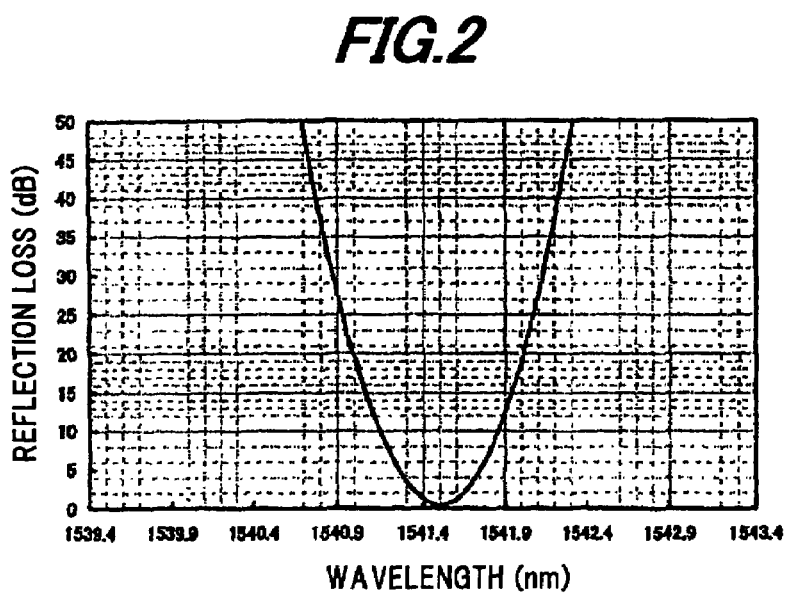
FIG. 2 is a characteristic graph showing a reflection loss characteristic with regard to a wavelength according to a fiber Bragg grating (FBG) 2 of the present invention.

Concerning an FBG, a reflection loss characteristic with respect to a wavelength includes a maximum reflection rate of 90% and a Gaussian distribution, and a half bandwidth of the reflection loss characteristic with respect to a wavelength is 0.4 nm which is equal to or more than $225/1000$ of the divisional wavelength bandwidth of the AWG, or equal to or more than $45/100$ of the half bandwidth of the AWG. The reflection loss characteristic of the FBG with respect to a wavelength is shown in FIG. 2. In FIG. 2, the center wavelength is 1541.5 nm.

An amount of a light output of each output channel of the AWG is shown in FIG. 3, which is obtained when the FBG has the reflection loss characteristic with respect to a wavelength shown in FIG. 2 and the reflected center wavelength of the FBG changes from 1539.4 nm to 1543.4 nm. In this case, a light amount of each output channel at a center wavelength is defined as 1, and a characteristic of each output channel is shown by a ratio of the light amount.

As shown in FIG. 3, when the FBG having a half bandwidth of 0.4 nm is used, a difference of an amount of a light output between an output channel closest to a center wavelength of the FBG of 1541.5 nm in FIG. 2 (e.g., output channel #2) and another output channel adjacent thereto (e.g., output channel #1 and output channel #3) is equal to or more than −40 dB. Therefore, even if the reflected center wavelength of the FBG slightly changes in a vicinity of the center wavelength of the output channel #2, an amount of a light output of another channel (e.g., output channel #1 and output channel #3) adjacent to the output channel #2 can be measured.

Consequently, whether the reflected center wavelength of the FBG changes to a shorter wavelength or a longer wavelength can be decided exactly. Thus, even if the reflected center wavelength of the FBG changes broadly across the divisional wavelength bands of a plurality of output channels, a change of the reflected center wavelength of the FBG can be measured sequentially.

Next, three different AWGs are assumed, which have a transmission characteristic that each output channel accords a Gaussian distribution, a maximum transmission rate of 100%, and a channel interval represented by a frequency of 50 GHz (a divisional wavelength bandwidth of an output channel of 0.4 nm, a half bandwidth of 0.2 nm), 100 GHz (a divisional wavelength bandwidth of an output channel of 0.8 nm, a half bandwidth of 0.4 nm), and 200 GHz (a divisional wavelength bandwidth of an output channel of 1.6 nm, a half bandwidth of 0.8 nm).

Further, it is assumed that an FBG has a maximum reflection rate of 90% and a reflection characteristic accorded by a Gaussian distribution, and an amount of a light output of an output channel is calculated while changing a half bandwidth in the reflection loss characteristic of the FBG with respect to a wavelength. A relation between a half bandwidth of the FBG obtained by the above calculating result and a difference of a light amount between adjacent output channels in the AWG is shown in FIG. 4.

Figure 4:
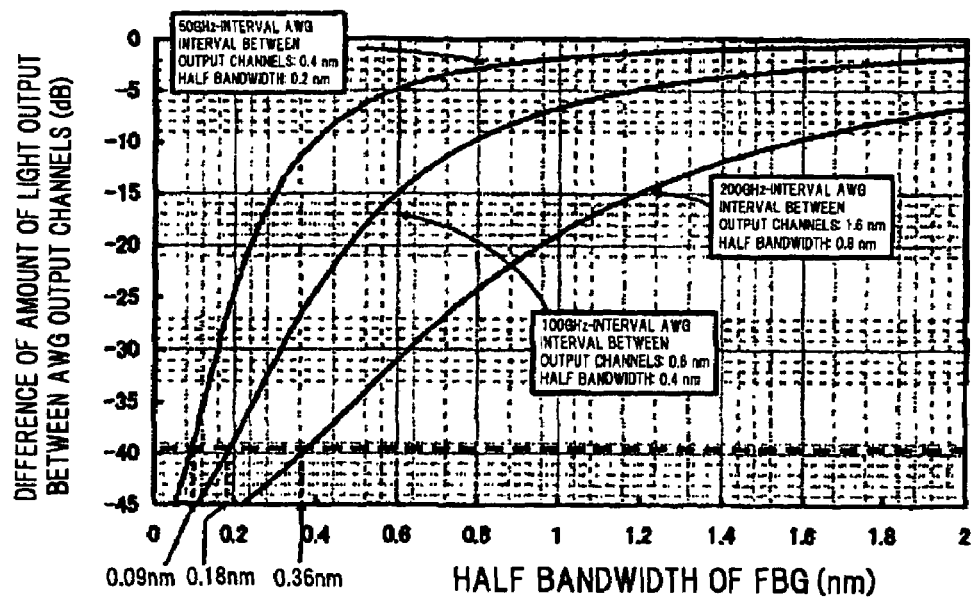
FIG. 4 is a characteristic graph showing a difference of an amount of a light output between optical channels of an AWG 5 with regard to a half bandwidth of the FBG 2.

According to FIG. 4, a half bandwidth of the FBG, where a characteristic line of the AWG having a channel interval of 50 GHz in a frequency crosses a line of −40 dB, is 0.09 nm. Similarly, half bandwidths of the FBG, where a characteristic line of the AWG having a channel interval of 100 GHz or 200 GHz crosses a line of 0 dB, are 0.18 nm and 0.36 nm, respectively. That is, when the half bandwidth of the FBG is equal to or more than $225/1000$ of the divisional wavelength bandwidth of each output channel, or equal to or more than $45/100$ of the half bandwidth of each output channel of the AWG, a difference of an amount of a light output between adjacent output channels is equal to or more than −40 dB.

According to the present invention, it is unnecessary to limit a relative position between a center wavelength of the AWG and a center wavelength of the FBG. When using a plurality of FBGs, if a reflection wavelength changing band of each FBG is more than a divisional wavelength bandwidth (e.g., about 32 nm when an AWG has 40 channels and 100 GHz interval) of each output channel of the AWG so as not to output the reflected lights of different FBGs to the same output channel, a change of reflected center wavelengths of a plurality of FBGs can be measured at the same time.

In the physical quantity measuring system 1 according to the present invention, a change of the reflected center wavelength of the FBG 2 is converted to a change of a light intensity. Since the AWG 5 used for the wavelength-intensity conversion does not have a movable portion, the AWG 5 is not a factor in limiting a measuring velocity of the center wavelength change of the FBG 2. Although the measuring velocity of the center wavelength change of the FBG 2 is limited by the ADC 11 or the CPU 7, by using an IC of the ADC 11 which can respond at a high speed of more than 100 MS/sec, a change of a temperature or a strain can be measured at a speed of more than 100 MS/sec in this system.

In the physical quantity measuring system 1 according to the present invention, although the reflected light of the FBG 2 is divided by the AWG 5 and measured, since concerning the reflected light, in addition to a first output channel where the reflected light transmits most, another output channel adjacent the first output channel can measure the amount of the light output of the output channel, a change of the reflected center wavelength of the FBG 2 can be measured broadly.

In more detail, when a dynamic range of the operating portion 7 is 40 dB, by using an FBG which has a bandwidth equal to or more than $225/1000$ of the divisional wavelength bandwidth of the AWG 5, or equal to or more than $45/100$ of the half bandwidth of the AWG 5, a difference of an amount of a light output between adjacent output channels in the AWG 5 in which the reflected light of the FBG 2 transmits, can be more than $-40$ dB, and a change of the center wavelength of the FBG which changes broadly across the divisional wavelength bands of a plurality of output channels, can be measured precisely.

Although the invention has been described with respect to specific exemplary embodiments for complete and clear disclosure, the appended claims are not to be thus limited but are to be construed as embodying all modifications and alternative constructions that may occur to one skilled in the art which fairly fall within the basic teaching herein set forth.

It is noted that Applicant's intent is to encompass equivalents of all claim elements, even if amended later during prosecution.

What is claimed is:

1. A physical quantity measuring system, comprising:
an optical fiber in which a plurality of fiber Bragg gratings having different reflection wavelength changing bands are formed along said optical fiber in a longitudinal direction;
a light source which outputs a broadband light covering the reflection wavelength changing bands of all of said fiber Bragg gratings into said optical fiber;
an arrayed waveguide grating which divides a light reflected by said fiber Bragg gratings and outputted from said optical fiber into a plurality of divisional wavelength bands having a constant wavelength interval, and which outputs the divided lights to output channels, respectively;
a plurality of light-receiving elements that receive output lights from the output channels, respectively; and
an operating portion which detects a change of a reflected center wavelength of each fiber Bragg grating by a change of an output of each of the light-receiving elements, and which calculates a physical quantity and a position thereof given to said optical fiber, said operating portion capable of detecting light from adjacent output channels,
wherein a difference between adjacent output channels in a characteristic of an amount of a light output with respect to a wavelength based on a superposition of a reflection loss characteristic of said fiber Bragg gratings with respect to a wavelength and a transmission loss characteristic of said arrayed waveguide grating with respect to a wavelength, is kept within a dynamic range of said operating portion with respect to the band of the reflection wavelength change of said fiber Bragg grating.

2. The physical quantity measuring system according to claim 1,
wherein the dynamic range of said operating portion is approximately 40 dB, and
wherein a half bandwidth in the reflection loss characteristic of said fiber Bragg grating with respect to a wavelength is equal to or more than $225/1000$ of a divisional wavelength bandwidth in the transmission loss characteristic of said arrayed waveguide grating with respect to a wavelength.

3. The physical quantity measuring system according to claim 1,
wherein the dynamic range of said operating portion is approximately 40 dB, and
wherein a half bandwidth in the reflection loss characteristic of said fiber Bragg grating with respect to a wavelength is equal to or more than $45/100$ of a half bandwidth in the transmission loss characteristic of said arrayed waveguide grating with respect to a wavelength.

4. The physical quantity measuring system according to claim 1, wherein:
said reflection wavelength changing band of a single fiber Bragg grating covers a divisional wavelength band of at least four output channels of said arrayed waveguide grating.

5. A physical quantity measuring method, comprising:
disposing an optical fiber in which a plurality of fiber Bragg gratings having different reflection wavelength changing bands are formed along said optical fiber in a longitudinal direction;
outputting a broadband light covering the reflection wavelength changing bands of all of said fiber Bragg gratings into said optical fiber;
dividing a light reflected by said fiber Bragg gratings and outputted from said optical fiber into a plurality of divisional wavelength bands having a constant wavelength interval by an arrayed waveguide grating, and outputting the divided lights to output channels, respectively;
receiving output lights from the output channels, respectively, by a plurality of light-receiving elements; and
detecting a change of a reflected center wavelength of each fiber Bragg grating by a change of an output of each of said light-receiving elements by an operating portion, and calculating a physical quantity and a position thereof given to said optical fiber,
wherein said operating portion is capable of detecting light from adjacent output channels,
wherein a difference between adjacent output channels in a characteristic of an amount of a light output with respect to a wavelength based on a superposition of a reflection loss characteristic of said fiber Bragg gratings with respect to a wavelength and a transmission loss characteristic of said arrayed waveguide grating with respect to a wavelength, is kept within a dynamic range of said operating portion with respect to the band of the reflection wavelength change of said fiber Bragg grating.

6. The physical quantity measuring method according to claim 5,
wherein the dynamic range of said operating portion is approximately 40 dB, and
wherein a half bandwidth in the reflection loss characteristic of said fiber Bragg grating with respect to a wavelength is equal to or more than $^{225}/_{1000}$ of a divisional wavelength bandwidth in the transmission loss characteristic of said arrayed waveguide grating with respect to a wavelength.

7. The physical quantity measuring method according to claim 5,
wherein the dynamic range of said operating portion is approximately 40 dB, and
wherein a half bandwidth in the reflection loss characteristic of said fiber Bragg grating with respect to a wavelength is equal to or more than $^{45}/_{100}$ of a half bandwidth in the transmission loss characteristic of said arrayed waveguide grating with respect to a wavelength.

8. The physical quantity measuring method according to claim 5, wherein:
said reflection wavelength changing band of a single fiber Bragg grating covers a divisional wavelength band of at least four output channels of said arrayed waveguide grating.

9. A physical quantity measuring system, comprising:
an optical fiber in which a plurality of fiber Bragg gratings having different reflection wavelength changing bands are formed along said optical fiber in a longitudinal direction;
a means for outputting a broadband light covering the reflection wavelength changing bands of all of said fiber Bragg gratings into said optical fiber;
a means for dividing a light reflected by said fiber Bragg gratings and outputted from said optical fiber into a plurality of divisional wavelength bands having a constant wavelength interval, and outputting the divided lights to output channels, respectively;
a means for receiving output lights from the output channels, respectively; and
a means for detecting a change of a reflected center wavelength of each fiber Bragg grating by a change of an output of said means for receiving output lights, and for calculating a physical quantity and a position thereof given to said optical fiber,
wherein said means for detecting a change is capable of detecting light from adjacent output channels,
wherein a difference between adjacent output channels in a characteristic of an amount of light output with respect to a wavelength based on a superposition of a reflection loss characteristic of said fiber Bragg gratings with respect to a wavelength and a transmission loss characteristic of said means for dividing the reflected light and outputting the divided lights with respect to a wavelength, is kept within a dynamic range of said operating portion with respect to the band of the reflection wavelength change of said fiber Bragg grating.

10. The physical quantity measuring system according to claim 1, further comprising an analog-digital converter provided between a digital input-output channel of the operating portion and each of the light receiving elements.

* * * * *